Figure 1:
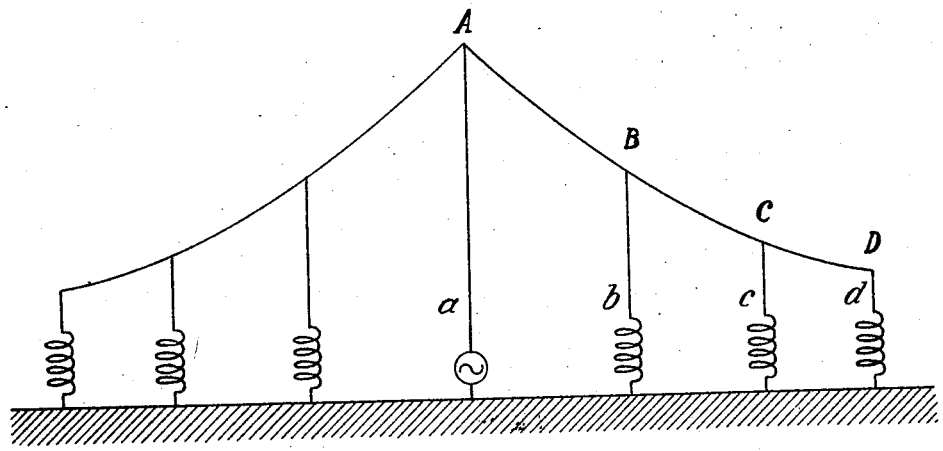

Aug. 10, 1926.

O. SCHELLER

MULTIPLE ANTENNA

Filed Feb. 3, 1925

1,595,166

Inventor:
Otto Scheller
by [signature]
Attorney

Patented Aug. 10, 1926.

1,595,166

UNITED STATES PATENT OFFICE.

OTTO SCHELLER, OF BERLIN-GROSS-LICHTERFELDE, GERMANY, ASSIGNOR TO C. LORENZ AKTIENGESELLSCHAFT, OF BERLIN-TEMPELHOF, GERMANY.

MULTIPLE ANTENNA.

Application filed February 3, 1925, Serial No. 6,593, and in Germany September 11, 1923.

My invention relates to aerials for use in systems of radio communication and has for its object to increase their radiating power.

All the transmitters of radiotelegraphy hitherto constructed have a very low efficiency owing to the fact that only a small portion of the energy converted to oscillations in the aerial is utilized for the purpose of radiation. A portion does not leave the aerial system and is gradually damped by its ohmic resistance. Of an energy really radiated only a small portion is radiated to a sufficient distance required for the working of the transmitter.

The manner of viewing things hitherto as to the action at a distance of a straight wire does not lead to an idea, which allows the arrangement to be effectively accomplished. The ideas which Maxwell has developed in the last century about the propagation of electrical oscillations, have not yet been taken up by technics, which would be necessary to utilize them fully for the present task of improving radiation.

In space telegraphy the action at a distance must be imagined to be caused in the following way:

As the displacement currents generate in the dielectric magnetic fields in the same way as currents do in conductors, and as further in a freely oscillating circuit consisting of capacity and self-inductance, the displacement currents in the capacity must be referring to time in phase coincidence with the currents in the conductor, the magnetic field of an oscillation circuit can only be such a one as can be produced by closed current lines. This law must be valid for all the current circuits, for closed ones as well as for open ones. The displacement currents must be in phase coincidence with the line-currents, since at the times when the whole energy is in the condenser, both currents, displacement currents and line-currents, must be zero. The form of the condenser cannot have any influence upon it.

The prior conception of the action at a distance of a conductor, e. g. a straight wire, can no more be maintained; the considerations about the action at a distance started from the magnetic field of a straight limited conductor, which for itself cannot exist and cannot be realized therefore. Since all the lines of current occur only as closed paths, there are in reality only fields such as are generated by such closed current circuits.

An action at a distance is only imaginable, if lines of current of reversed direction have such a great distance that the fields of the single line of current interfere with each other so that they do not neutralize each other, but sum each other, if possible. In the normal aerial systems hitherto used the action at a distance is done by at least some lines of the displacement current running at a large distance from the conductor, thereby an action of interference being made between the field of these lines of current and the current in the conductor.

I may essentially improve radiation—according to my proposal dating from the year 1911—by giving the conductor a diameter as large as possible, by which more lines of force are forced outwards, so that more lines of current take part in the interference action. Thus by increasing the diameter I can increase radiation nearly at my will, I do not yet obtain, however, the maximum of radiation which is possible at the actual diameter of the aerial system.

In order to obtain this maximum radiation it is necessary that as few displacement currents as possible run in the neighbourhood of the conductor. I obtain that—just as in the former proposal—by subdividing the conductor into many single lines and by making all the single conductors oscillate in phase, but by distributing the single lines in such a way that as far as possible no lines of force can circulate from the upper end of the lines between the single conductors but that, if possible, all the displacement current lines are forced outwards. For this purpose the lines individually tuned, according to the density of electric fields generated by them, are distributed over the whole area covered by the aerial. For the first approximation it will be sufficient to distribute the conductors upon a ring which is most favourably fed with energy from the centre. Since all the fields oscillate in phase, they generate fields of the same sense. Thereby the back running lines of current of the displaced currents find their way between the conductors barred, and these are forced outwards. By the form of the area I can prefer the radiation in a certain direction which is well known.

By the dense arrangement of the different radiators I obtain in the same time that the earth area below the whole radiator system is covered with the earthing devices somewhat equally, so that great densities of earth-currents are avoided and in the same time the development of displacement currents in contrary direction within the aerial system is effectively counteracted against.

By way of example of my invention the accompanying drawings show an aerial which mainly is carried by one single high mast, and which is to radiate in all directions uniformly.

Figure 2:
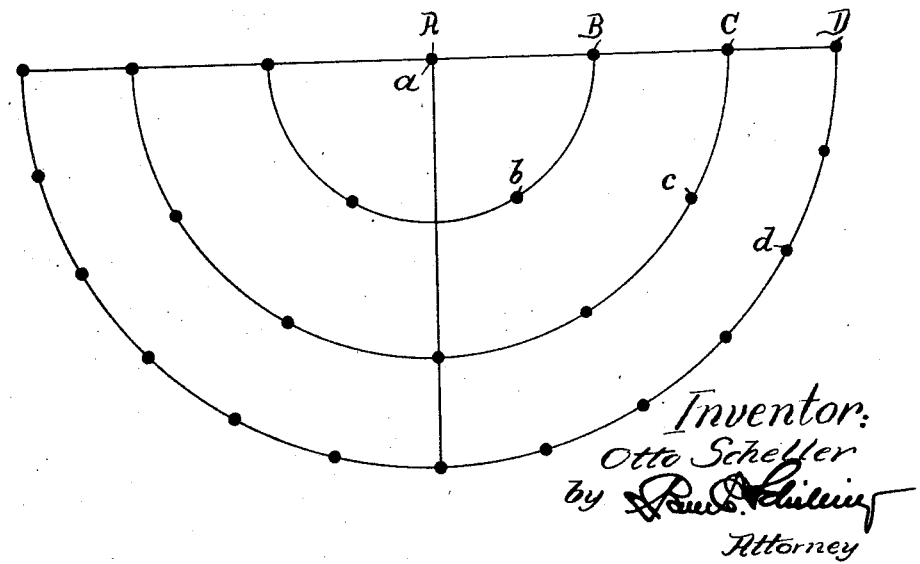

Fig. 1 shows the elevation,
Fig. 2 half the plan.

As the height of the aerial decreases outwards the vertical lines $a$, $b$, $c$, $d$ are arranged closer together. When A is the highest point of the line $a$, the tuning of $b$, $c$, $d$ can be effected in such a manner that reflection of the energy oscillating in these lines take place in A. Correspondingly, when B marks the junction point of $c$ at the highest point of $b$, C the junction point of $d$ at the highest point of $c$, on the other hand the tuning of $c$ may also be effected in such a way that reflection takes place at point B, that of $d$ so that reflection takes place at C. The exact position of the reflection points is not essential for the utilization of my invention provided they do not lie on the single lines $a$, $b$, $c$ and $d$, for in these lines all the currents are to oscillate at the same time in the same direction. $a$ having the smallest capacity, here the wattless currents will be smallest, practically $a$ carries only the whole watt current. Therefore the whole transmitting set may be made smaller. As the distance of the upper part of $d$ to the earth is less than say of $b$, there is a risk that considerably more lines of force run to earth between $c$ and $d$. Therefore the intervals between $c$ and $d$ and between the single lines of $d$ (Fig. 2) are chosen smaller than in the middle of the system. In case the uniformity of radiation at an aerial system according to Fig. 2 should not be sufficient, the number of the lines going radially from the middle of the arrangement and directed downwards such as AD (D being the highest point of $d$) can be increased as may be required.

What I claim is:

1. A multiple antenna structure comprising in combination a plurality of earthed conductors, a source of high frequency current for exciting said conductors in like time phase, means for neutralizing substantially all electric lines within the antenna structure and forcing them outside said structure by suitably dimensioning the earthed conductors and distributing them in proportion to the strength of the electric fields generated thereby for increasing radiation of said source and reducing losses therein.

2. In a multiple antenna structure the combination of a central earthed conductor, a high frequency source for energizing said conductor, a plurality of earthed conductors arranged around and all united with said central conductor, said plurality of earthed conductors having heights decreasing with the distance from said central conductor and with their respective distances one from another proportioned according to the density of the electric lines of force generated therein by them.

3. In a multiple antenna structure, the combination of a central earthed conductor, a high frequency source for exciting said conductor, a plurality of concentric rows of earthed conductors united all at their upper ends with said central conductor, each row of said last mentioned conductors decreasing in height in an outward direction and each concentric row having said plurality of conductors decreasing in spaced relationship in proportion to the height thereof.

4. A multiple antenna structure comprising in combination a central vertically disposed grounded conductor, a source of high frequency oscillations connected with said conductor, a plurality of tuned conductors positioned in radial lines with respect to said central conductor, said last mentioned conductors being spaced from each other at varying distances and each having varying heights with the upper extremities thereof connected with the upper extremity of said central conductor for increasing the radiation of said source and reducing the losses in said antenna structure.

5. A multiple antenna structure comprising in combination a central vertically disposed conductor, a high frequency source for exciting said conductor, a plurality of vertically disposed conductors positioned in radial lines with respect to said central conductor, said plurality of conductors being spaced one from another at varying distances and each varying in height and having the extremities thereof connected with the extremity of said central conductor for increasing the radiation of said source and reducing the losses in said antenna structure.

6. A multiple antenna structure comprising in combination a vertical centrally disposed conductor, a source of high frequency current for exciting said conductor, a plurality of vertically extending conductors positioned in radial lines on either side of said central vertical conductor, said plurality of conductors being spaced one from another and from said central conductor over different distances and each of said plurality of conductors having different heights with respect to said central conductor, with the upper extremities thereof connected with the upper extremity of said central conductor for increasing the radiation from said source and reducing losses in said antenna structure.

7. A multiple antenna structure comprising in combination a central vertically disposed conductor, a plurality of vertically disposed conductors arranged in radial lines with respect to said central conductor and in concentric circles around said central conductor with the distances between the concentric circles in which said plurality of vertically disposed conductors are arranged varying one from another and with the heights of said plurality of conductors varying one from another and connected at their upper extremities with the upper extremity of said central conductor for increasing the radiation from said antenna structure and reducing electrical losses therein.

8. A multiple antenna structure comprising in combination a central vertically disposed conductor, a source of high frequency oscillations for exciting said conductor, a plurality of vertically disposed conductors arranged in radially extending lines on opposite sides of said centrally disposed conductor, said plurality of conductors being arranged in concentric circles with the distances between said concentric circles growing smaller as said plurality of conductors extend outwardly and with the heights of said plurality of conductors growing smaller as said plurality of conductors extend outwardly, with connections extending from the extremity of said centrally disposed conductor in a downward direction to the extremities of each of said plurality of conductors for increasing the radiation of said antenna structure and reducing the losses therein.

In testimony whereof I have affixed my signature.

OTTO SCHELLER.